(12) United States Patent
Yea et al.

(10) Patent No.: US 11,475,604 B2
(45) Date of Patent: Oct. 18, 2022

(54) METHOD AND APPARATUS FOR ADAPTIVE POINT CLOUD ATTRIBUTE CODING

(71) Applicant: TENCENT AMERICA LLC, Palo Alto, CA (US)

(72) Inventors: Sehoon Yea, Palo Alto, CA (US); Arash Vosoughi, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 111 days.

(21) Appl. No.: 16/823,563

(22) Filed: Mar. 19, 2020

(65) Prior Publication Data

US 2020/0311984 A1 Oct. 1, 2020

Related U.S. Application Data

(60) Provisional application No. 62/824,262, filed on Mar. 26, 2019.

(51) Int. Cl.
*G06T 9/40* (2006.01)

(52) U.S. Cl.
CPC ....................... *G06T 9/40* (2013.01)

(58) Field of Classification Search
CPC ............ G06T 9/40; G06T 9/001; G06T 9/004
USPC ......................................................... 382/239
See application file for complete search history.

(56) References Cited

U.S. PATENT DOCUMENTS

| 2012/0176404 A1 | 7/2012 | Broughton et al. |
| 2019/0081638 A1 | 3/2019 | Mammou et al. |

FOREIGN PATENT DOCUMENTS

| JP | 2013-502601 A | 1/2013 |
| WO | 2019/055772 A1 | 3/2019 |
| WO | 2020/072319 A1 | 4/2020 |

OTHER PUBLICATIONS

International Search Report and Written Opinion dated Jun. 25, 2020, issued by the International Searching Authority in application No. PCT/US2020/024371.
Supplementary European Search Report dated Nov. 23, 2021 in Application No. 20778739.1.
Extended European Search Report dated Nov. 5, 2021 in Application No. 20778739.1.

(Continued)

*Primary Examiner* — Michael R Neff
(74) *Attorney, Agent, or Firm* — Sughrue Mion, PLLC

(57) ABSTRACT

A method of adaptive point cloud attribute coding includes obtaining an attribute of a current point included in point cloud data, and obtaining candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points. The method further includes selecting, for the obtained attribute, one among the obtained candidate predicted values, using rate-distortion optimization, and setting, for a decoder, a flag indicating whether the obtained candidate predicted values includes the weighted average value.

20 Claims, 8 Drawing Sheets

(56) References Cited

OTHER PUBLICATIONS

Khaled Mammou et al., "G-PCC codec description v2", 3DG, ISO/IEC JTC1/SC29/WG11, N18189, 2019, Marrakech, MA, 39 pages.
Li Ma et al., "A fast background model based surveillance video coding in HEVC", 2014, IEEE Visual communications and Image Processing Conference, pp. 237-240 (4 pages).
Office Action dated Aug. 23, 2022 in Japanese Application No. 2021-535208.

METHOD AND APPARATUS FOR ADAPTIVE POINT CLOUD ATTRIBUTE CODING

CROSS-REFERENCE TO RELATED APPLICATION

This application claims priority from U.S. Provisional Patent Application No. 62/824,262, filed on Mar. 26, 2019, in the U.S. Patent and Trademark Office, which is incorporated herein by reference in its entirety.

BACKGROUND

1. Field

Methods and apparatuses consistent with embodiments relate to graph-based point cloud compression (G-PCC), and more particularly, a method and an apparatus for adaptive point cloud attribute coding.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands up to billions of points to realistically represent reconstructed scenes.

Compression technologies are needed to reduce the amount of data to represent a point cloud. As such, technologies are needed for lossy compression of point clouds for use in real-time communications and six degrees of freedom (6DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

FIG. 1 is a diagram illustrating a method of generating levels of detail (LoD) in G-PCC.

Referring to FIG. 1, in current G-PCC attributes coding, an LoD (i.e., a group) of each 3D point (e.g., P0-P9) is generated based on a distance of each 3D point, and then attribute values of 3D points in each LoD is encoded by applying prediction in an LoD-based order 110 instead of an original order 105 of the 3D points. For example, an attributes value of the 3D point P2 is predicted by calculating a distance-based weighted average value of the 3D points P0, P5 and P4 that were encoded or decoded prior to the 3D point P2.

A current anchor method in G-PCC proceeds as follows.

First, a variability of a neighborhood of a 3D point is computed to check how different neighbor values are, and if the variability is lower than a threshold, the calculation of the distance-based weighted average prediction is conducted by predicting attribute values $(\alpha_i)_{i \in 0 \ldots k-1}$, using a linear interpolation process based on distances of nearest neighbors of a current point i. Let $N_i$ be a set of k-nearest neighbors of the current point i, let $(\tilde{\alpha}_j)_{j \in N_i}$ be their decoded/reconstructed attribute values and let $(\delta_j)_{j \in N_i}$ be their distances to the current point i. A predicted attribute value $\hat{a}_i$ is then given by:

$$\hat{a}_i = \text{Round}\left(\frac{1}{k}\sum_{j \in N_i}\frac{\frac{1}{\delta_j^2}}{\sum_{j \in N_i}\frac{1}{\delta_j^2}}\tilde{a}_j\right).$$

Note that geometric locations of all point clouds are already available when attributes are coded. In addition, the neighboring points together with their reconstructed attribute values are available both at an encoder and a decoder as a k-dimensional tree structure that is used to facilitate a nearest-neighbor search for each point in an identical manner.

Second, if the variability is higher than the threshold, a rate-distortion optimized (RDO) predictor selection is performed. Multiple predictor candidates or candidate predicted values are created based on a result of a neighbor point search in generating LoD. For example, when the attributes value of the 3D point P2 is encoded by using prediction, a weighted average value of distances from the 3D point P2 to respectively the 3D points P0, P5 and P4 is set to a predictor index equal to 0. Then, a distance from the 3D point P2 to the nearest neighbor point P4 is set to a predictor index equal to 1. Moreover, distances from the 3D point P2 to respectively the next nearest neighbor points P5 and P0 are set to predictor indices equal to 2 and 3, as shown in Table 1 below.

TABLE 1

Sample of predictor candidate for attributes coding

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

After creating predictor candidates, a best predictor is selected by applying a rate-distortion optimization procedure, and then, a selected predictor index is mapped to a truncated unary (TU) code, bins of which will be arithmetically encoded. Note that a shorter TU code will be assigned to a smaller predictor index in Table 1.

A maximum number of predictor candidates MaxNumCand is defined and is encoded into an attributes header. In the current implementation, the maximum number of predictor candidates MaxNumCand is set to equal to numberOfNearestNeighborsInPrediction+1 and is used in encoding and decoding predictor indices with a truncated unary binarization.

In prediction for attribute coding in G-PCC, an order of predictor candidate selection is fixed, as shown in the Table 1. However, depending on data characteristics and a variability threshold, frequencies of chosen predictor indices will not follow a fixed order as given in the Table 1, which will lead to degraded compression efficiency.

SUMMARY

According to embodiments, a method of adaptive point cloud attribute coding is performed by at least one processor and includes obtaining an attribute of a current point included in point cloud data, and obtaining candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points. The method further includes selecting, for the obtained attribute, one among the obtained candidate predicted values, using rate-distortion optimization, and setting, for a decoder, a flag indicating whether the obtained candidate predicted values includes the weighted average value.

According to embodiments, an apparatus for adaptive point cloud attribute coding includes at least one memory configured to store computer program code, and at least one processor configured to access the at least one memory and operate according to the computer program code. The computer program code includes first obtaining code configured to cause the at least one processor to obtain an attribute of a current point included in point cloud data, and second obtaining code configured to cause the at least one processor to obtain candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points. The computer program code further includes selecting code configured to cause the at least one processor to select, for the obtained attribute, one among the obtained candidate predicted values, using rate-distortion optimization, and setting code configured to cause the at least one processor to set, for a decoder, a flag indicating whether the obtained candidate predicted values includes the weighted average value.

According to embodiments, a non-transitory computer-readable storage medium storing instructions that cause at least one processor to obtain an attribute of a current point included in point cloud data, and obtain candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points. The instructions further cause the at least one processor to select, for the obtained attribute, one among the obtained candidate predicted values, using rate-distortion optimization, and set, for a decoder, a flag indicating whether the obtained candidate predicted values includes the weighted average value.

DETAILED DESCRIPTION

Embodiments described herein provide a method and an apparatus for adaptive point cloud attribute coding. As discussed above, an RDO predictor in G-PCC encodes an optimal predictor index for each point cloud attribute. This means a coding cost of such side information can be a burden when a corresponding distortion reduction in return for a use of the side information is relatively small, as in a case of a low-variance signal, or when coding at low bitrates.

Thus, in this disclosure, methods of adaptive determination of a predictor index are proposed. The rationale is that because use of an average predictor is already considered in a variability threshold check step as described above, it is likely that the inclusion of the average predictor in a subsequent RDO decision step can be somewhat redundant and may lead to a reduced rate-distortion efficiency. This can become more useful when a relative overhead of predictor-index coding is large as in coding of low dynamic range reflectance data or coding at low bitrates.

Figure 2:
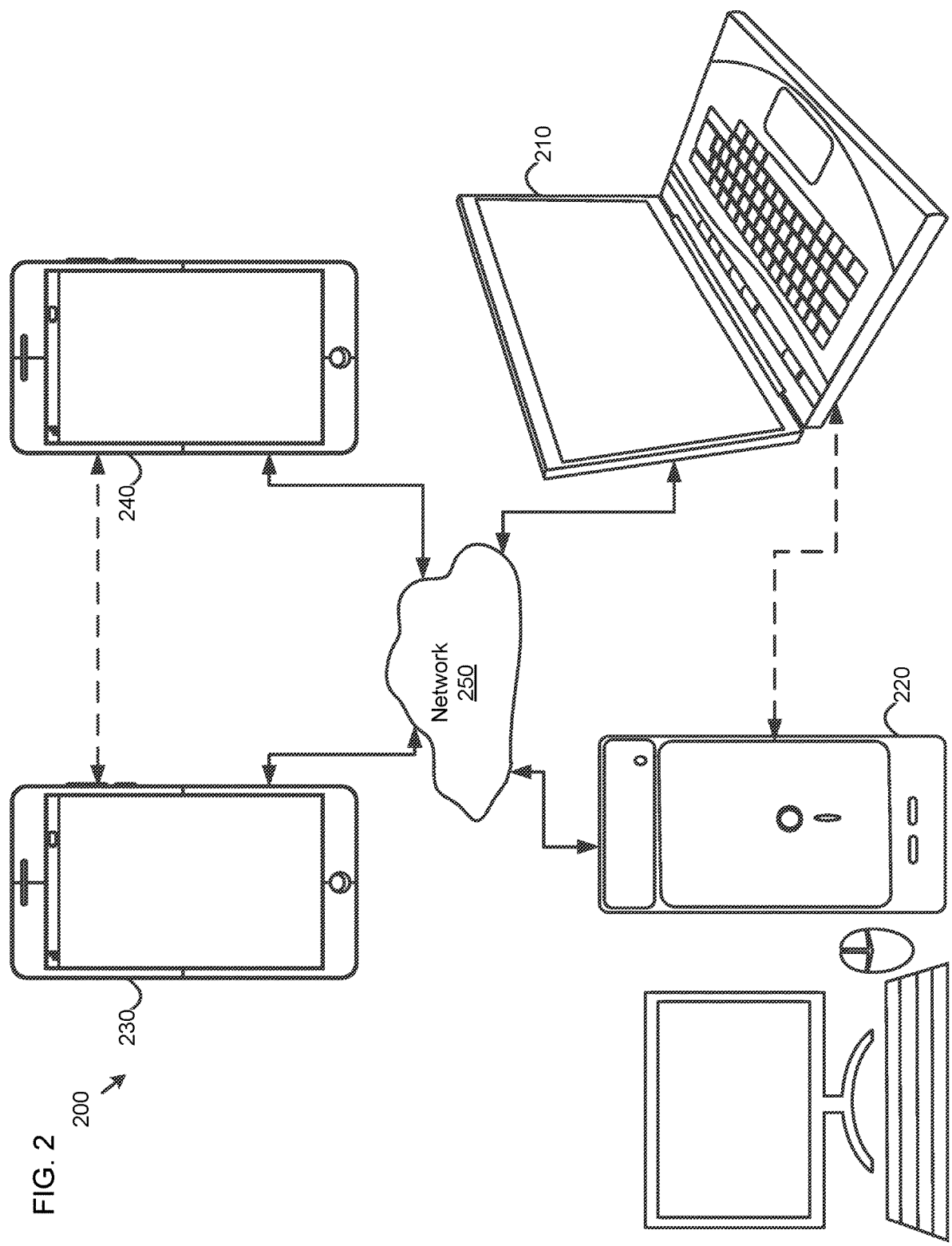
FIG. 2 is a block diagram of a communication system according to embodiments.

FIG. 2 is a block diagram of a communication system 200 according to embodiments. The communication system 200 may include at least two terminals 210 and 220 interconnected via a network 250. For unidirectional transmission of data, a first terminal 210 may code point cloud data at a local location for transmission to a second terminal 220 via the network 250. The second terminal 220 may receive the coded point cloud data of the first terminal 210 from the network 250, decode the coded point cloud data and display the decoded point cloud data. Unidirectional data transmission may be common in media serving applications and the like.

FIG. 2 further illustrates a second pair of terminals 230 and 240 provided to support bidirectional transmission of coded point cloud data that may occur, for example, during videoconferencing. For bidirectional transmission of data, each terminal 230 or 240 may code point cloud data captured at a local location for transmission to the other terminal via the network 250. Each terminal 230 or 240 also may receive the coded point cloud data transmitted by the other terminal, may decode the coded point cloud data and may display the decoded point cloud data at a local display device.

In FIG. 2, the terminals 210-240 may be illustrated as servers, personal computers and smartphones, but principles of the embodiments are not so limited. The embodiments find application with laptop computers, tablet computers, media players and/or dedicated video conferencing equipment. The network 250 represents any number of networks that convey coded point cloud data among the terminals 210-240, including for example wireline and/or wireless communication networks. The communication network 250 may exchange data in circuit-switched and/or packet-switched channels. Representative networks include telecommunications networks, local area networks, wide area networks and/or the Internet. For the purposes of the present discussion, an architecture and topology of the network 250 may be immaterial to an operation of the embodiments unless explained herein below.

Figure 3:
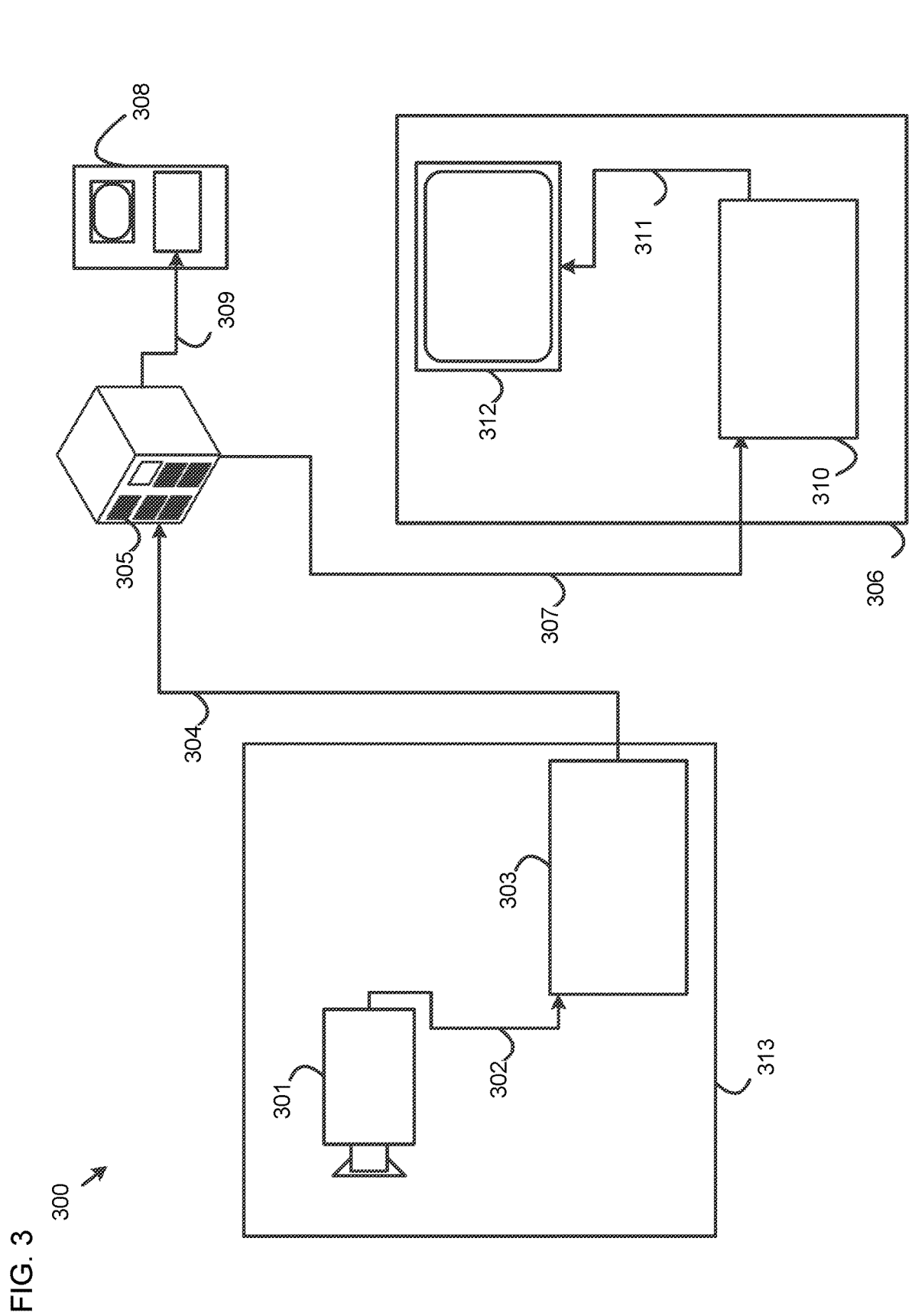
FIG. 3 is a diagram of a placement of a G-PCC compressor and a G-PCC decompressor in an environment, according to embodiments.

FIG. 3 is a diagram of a placement of a G-PCC compressor 303 and a G-PCC decompressor 310 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 300 may include a capture subsystem 313 that can include a point cloud source 301, for example a digital camera, creating, for example, uncompressed point cloud data 302. The point cloud data 302 having a higher data volume can be processed by the G-PCC compressor 303 coupled to the point cloud source 301. The G-PCC compressor 303 can include hardware, software, or a combination thereof to enable or implement aspects of the disclosed subject matter as described in more detail below. Encoded point cloud data 304 having a lower data volume can be stored on a streaming server 305 for future use. One or more streaming clients 306 and 308 can access the streaming server 305 to retrieve copies 307 and 309 of the encoded point cloud data 304. A client 306 can include the G-PCC decompressor 310, which decodes an incoming copy 307 of the encoded point cloud data and creates outgoing point cloud data 311 that can be rendered on a display 312 or other rendering devices (not depicted). In some streaming systems, the encoded point cloud data 304, 307 and 309 can be encoded according to video coding/compression standards. Examples of those standards include those being developed by MPEG for G-PCC.

Figure 4:
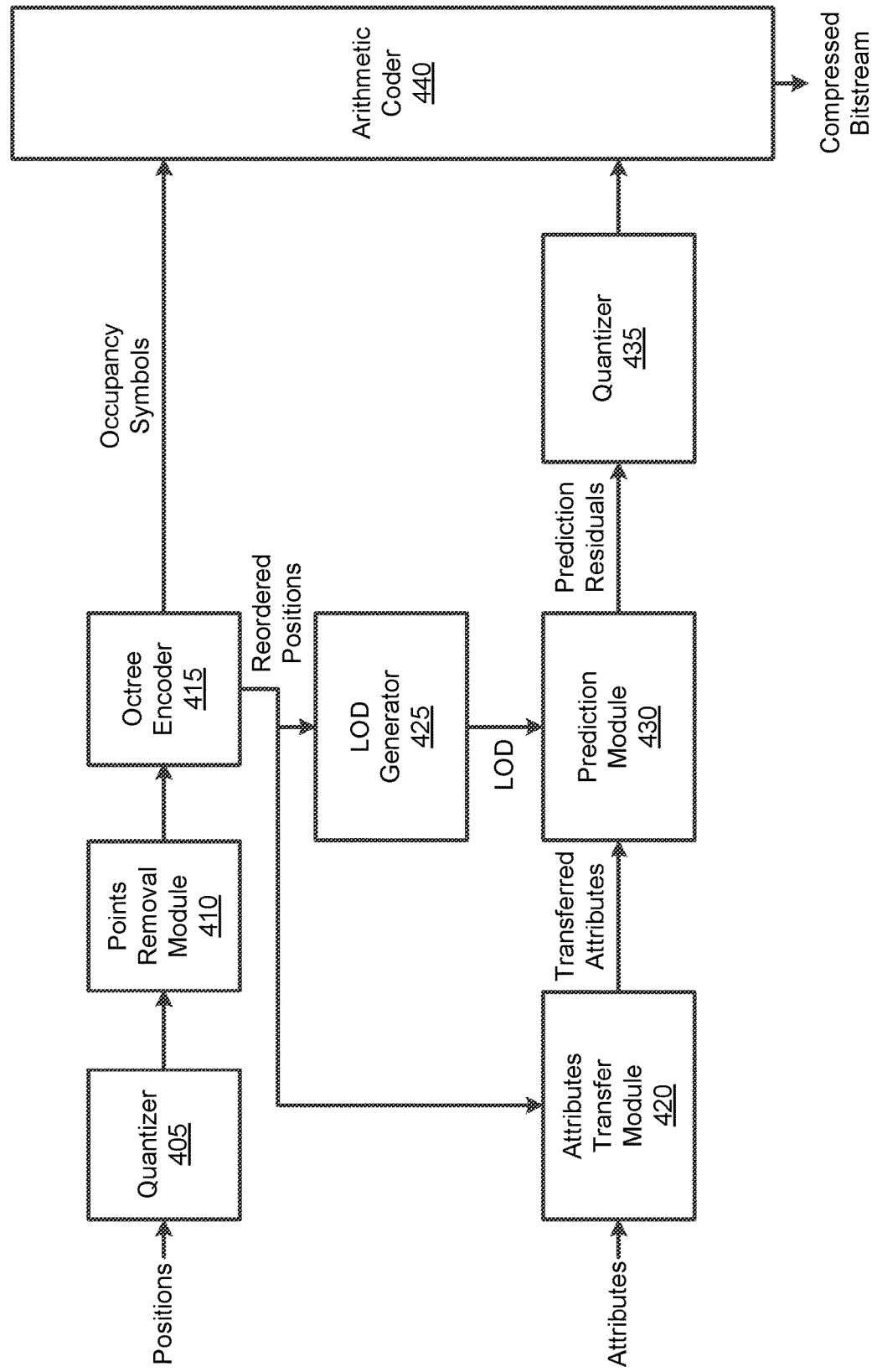
FIG. 4 is a functional block diagram of the G-PCC compressor according to embodiments.

FIG. 4 is a functional block diagram of a G-PCC compressor 303 according to embodiments.

As shown in FIG. 4, the G-PCC compressor 303 includes a quantizer 405, a points removal module 410, an octree encoder 415, an attributes transfer module 420, an LoD generator 425, a prediction module 430, a quantizer 435 and an arithmetic coder 440.

The quantizer 405 receives positions of points in an input point cloud. The positions may be (x,y,z)-coordinates. The quantizer 405 further quantizes the received positions, using, e.g., a scaling algorithm and/or a shifting algorithm.

The points removal module 410 receives the quantized positions from the quantizer 405, and removes or filters duplicate positions from the received quantized positions.

The octree encoder 415 receives the filtered positions from the points removal module 410, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 415 further reorders the received filtered positions, based on the encoding of the filtered positions.

The attributes transfer module 420 receives attributes of points in the input point cloud. The attributes may include, e.g., a color or RGB value and/or a reflectance of each point. The attributes transfer module 420 further receives the reordered positions from the octree encoder 415.

The attributes transfer module 420 further updates the received attributes, based on the received reordered positions. For example, the attributes transfer module 420 may perform one or more among pre-processing algorithms on the received attributes, the pre-processing algorithms including, for example, weighting and averaging the received attributes and interpolation of additional attributes from the received attributes. The attributes transfer module 420 further transfers the updated attributes to the prediction module 430.

The LoD generator 425 receives the reordered positions from the octree encoder 415, and obtains an LoD of each of the points corresponding to the received reordered positions. Each LoD may be considered to be a group of the points, and may be obtained based on a distance of each of the points. For example, as shown in FIG. 1, points P0, P5, P4 and P2 may be in an LoD LOD0, points P0, P5, P4, P2, P1, P6 and P3 may be in an LoD LOD1, and points P0, P5, P4, P2, P1, P6, P3, P9, P8 and P7 may be in an LoD LOD2.

The prediction module 430 receives the transferred attributes from the attributes transfer module 420, and receives the obtained LoD of each of the points from the LoD generator 425. The prediction module 430 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

Figure 1:
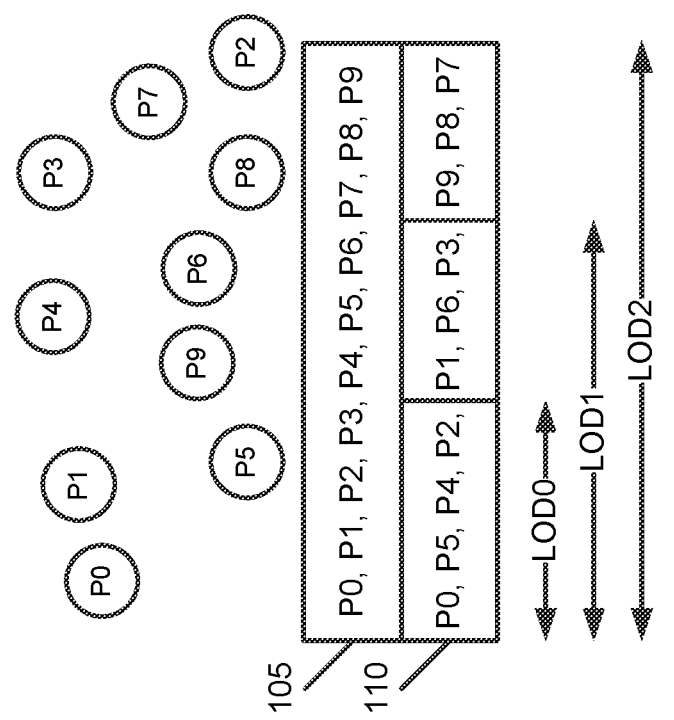
FIG. 1 is a diagram illustrating a method of generating LoD in G-PCC.

For example, as shown in FIG. 1, the prediction residuals respectively of the received attributes of the points P0, P5, P4 and P2 included in the LoD LOD0 may be obtained first prior to those of the received attributes of the points P1, P6, P3, P9, P8 and P7 included respectively in the LoDs LOD1 and LOD2. The prediction residuals of the received attributes of the point P2 may be obtained by calculating a distance based on a weighted average of the points P0, P5 and P4.

The quantizer 435 receives the obtained prediction residuals from the prediction module 430, and quantizes the received predicted residuals, using, e.g., a scaling algorithm and/or a shifting algorithm.

The arithmetic coder 440 receives the occupancy symbols from the octree encoder 415, and receives the quantized prediction residuals from the quantizer 435. The arithmetic coder 440 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 5:
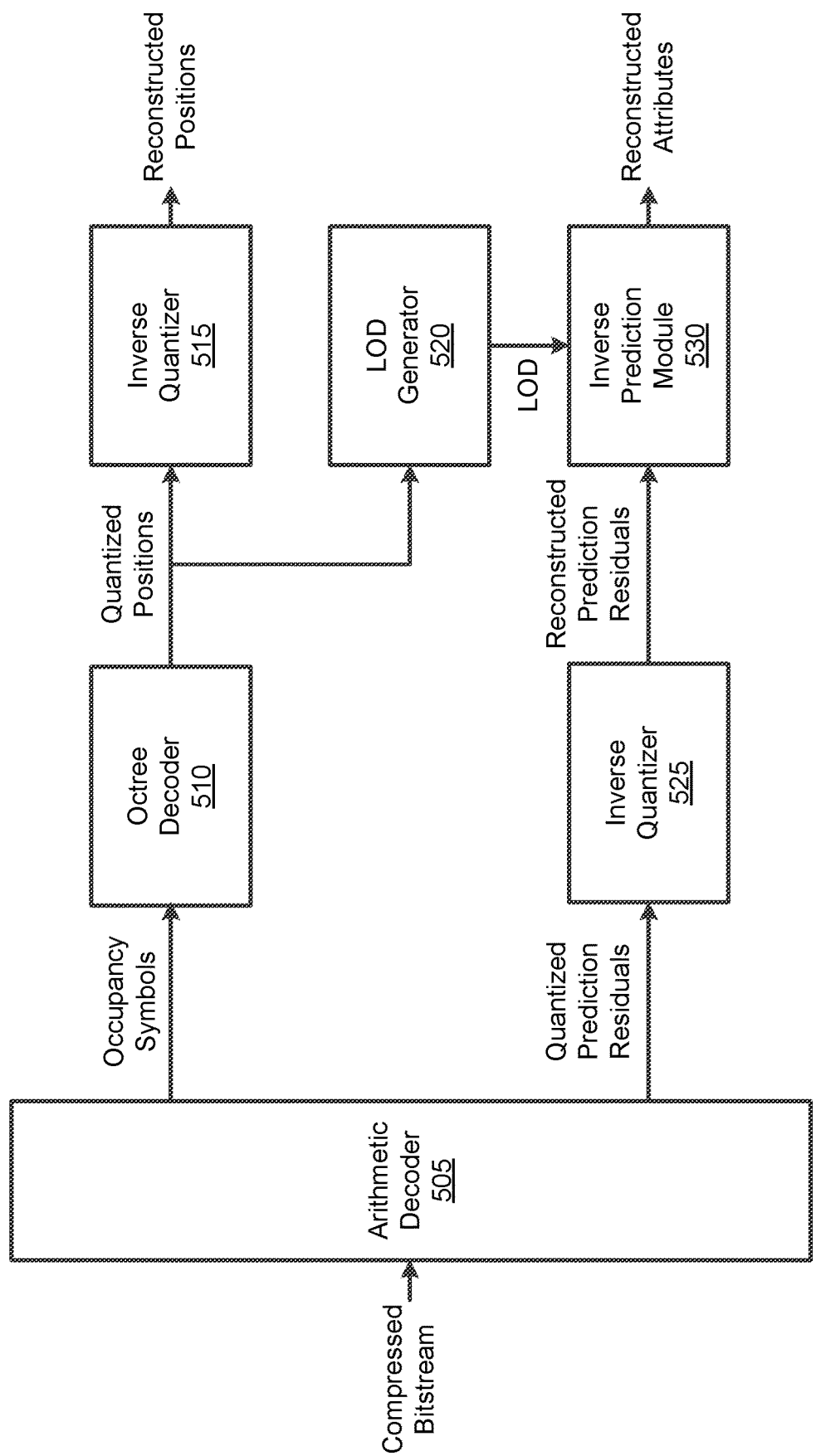
FIG. 5 is a functional block diagram of the G-PCC decompressor according to embodiments.

FIG. 5 is a functional block diagram of a G-PCC decompressor 310 according to embodiments.

As shown in FIG. 5, the G-PCC decompressor 310 includes an arithmetic decoder 505, an octree decoder 510, an inverse quantizer 515, an LoD generator 520, an inverse quantizer 525 and an inverse prediction module 530.

The arithmetic decoder 505 receives the compressed bitstream from the G-PCC compressor 303, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 510 receives the obtained occupancy symbols from the arithmetic decoder 505, and decodes the received occupancy symbols into the quantized positions, using an octree decoding algorithm.

The inverse quantizer 515 receives the quantized positions from the octree decoder 510, and inverse quantizes the received quantized positions, using, e.g., a scaling algorithm and/or a shifting algorithm, to obtain reconstructed positions of the points in the input point cloud.

The LoD generator 520 receives the quantized positions from the octree decoder 510, and obtains the LoD of each of the points corresponding to the received quantized positions.

The inverse quantizer 525 receives the obtained quantized prediction residuals, and inverse quantizes the received quantized prediction residuals, using, e.g., a scaling algorithm and/or a shifting algorithm, to obtain reconstructed prediction residuals.

The inverse prediction module 530 receives the obtained reconstructed prediction residuals from the inverse quantizer 525, and receives the obtained LoD of each of the points from the LoD generator 520. The inverse prediction module 530 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The method and the apparatus for adaptive point cloud attribute coding will now be described in detail. Such a method and an apparatus may be implemented in the G-PCC compressor 303 described above, namely, the prediction module 430.

In embodiments, a signal flag is sent from an encoder (the G-PCC compressor 303) to a decoder (the G-PCC decompressor 310) that indicates whether to include or exclude an average predictor or average predicted value from a list of predictor indices shown in Table 1 above. Such a signal flag can be sent from the encoder per sequence or per frame.

In embodiments, the encoder can set the signal flag, based on local statistics obtainable both at the encoder and the decoder. As an example, a histogram counting of most frequently chosen predictor candidates in a predesignated past time window can be used to determine if the average predictor is to be included in the list or not. If a number of uses of the average predictor is below a predetermined threshold, the encoder removes the average predictor from the candidate list.

In embodiments, an adaptive reordering of the predictor indices assigned to the predicted values is conducted based on a criterion reflecting a likelihood of each predictor candidate. As an example, if the nearest point P4 has been chosen more often than average, the predicted value of the nearest point P4 will be assigned a first predictor index 0, and the average predicted value will be assigned a second predictor index 1 (or further behind). This process may be generalized to sort all the predictor candidates in an order of frequency of choices or uses, and assign the corresponding predictor indices to the predictor candidates. The higher-ranked predicted values (e.g., with the first predictor index 0) may be selected before the lower-ranked predicted values (e.g., with the second predictor index 1).

In embodiments, a combination of the signal flag and the adaptive reordering of the predictor indices can be used.

Figure 6:
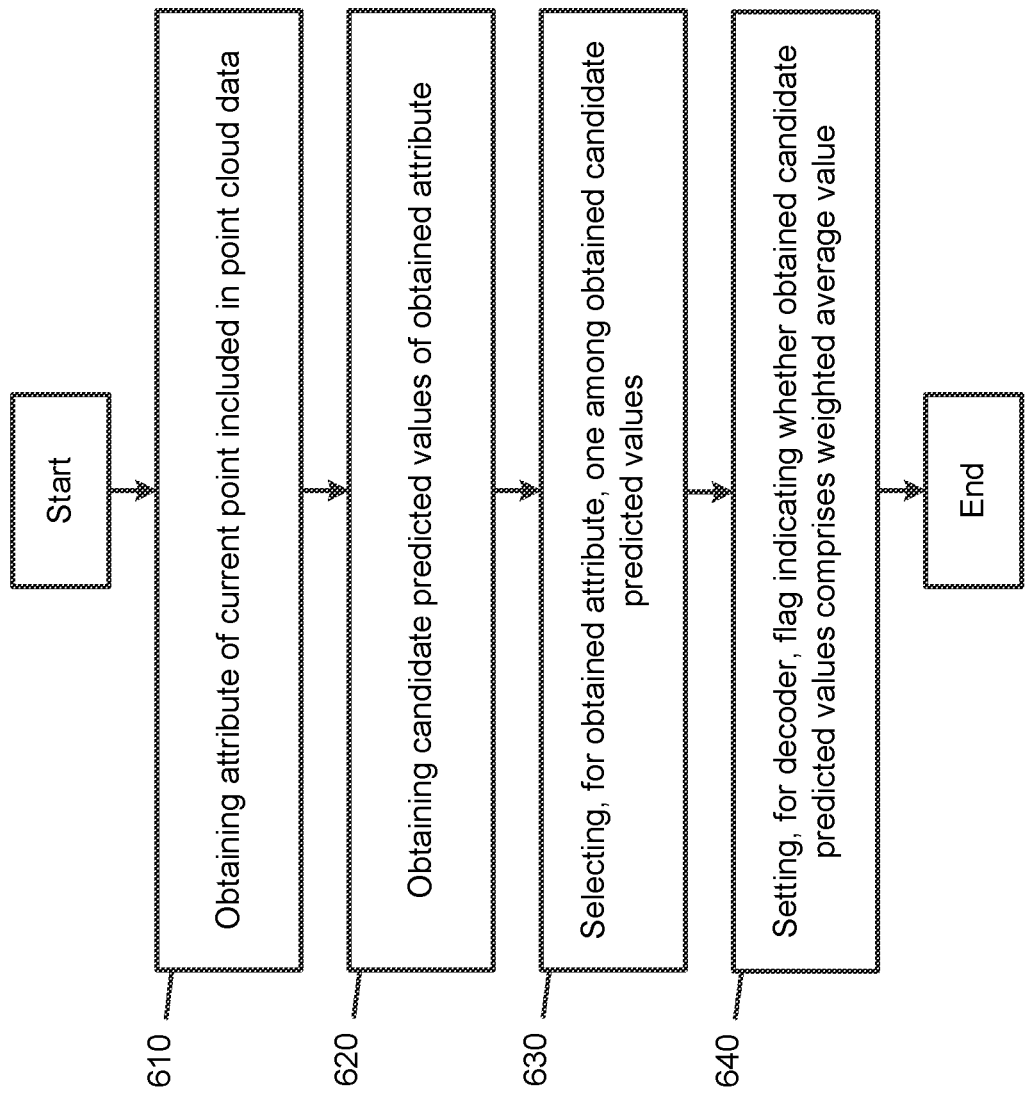
FIG. 6 is a flowchart illustrating a method of adaptive point cloud attribute coding, according to embodiments.

FIG. 6 is a flowchart illustrating a method 600 of adaptive point cloud attribute coding, according to embodiments. In some implementations, one or more process blocks of FIG. 6 may be performed by the G-PCC decompressor 310. In some implementations, one or more process blocks of FIG. 6 may be performed by another device or a group of devices separate from or including the G-PCC decompressor 310, such as the G-PCC compressor 303.

Referring to FIG. 6, in a first block 610, the method 600 includes obtaining an attribute of a current point included in point cloud data.

In a second block 620, the method 600 includes obtaining candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points.

In a third block 630, the method 600 includes selecting, for the obtained attribute, one among the obtained candidate predicted values, using rate-distortion optimization.

In a fourth block 640, the method 600 includes setting, for a decoder, a flag indicating whether the obtained candidate predicted values includes the weighted average value.

The method may further include transmitting, to the decoder, the flag per sequence or per frame.

The method may further include identifying whether a number of uses of the weighted average value is below a predetermined threshold. The setting the flag may include, based on the number of uses of the weighted average value being identified to be below the predetermined threshold, removing the weighted average value from the obtained candidate predicted values and setting the flag to indicate that the obtained candidate predicted values do not include the weighted average value.

The method may further include identifying the number of uses of the weighted average value, based on a histogram counting most frequently chosen ones among the obtained candidate predicted values in a predesignated time window.

The method may further include obtaining an order of the obtained candidate predicted values, based on a number of uses of each of the obtained candidate predicted values.

The method may further include identifying the number of uses of each of the obtained candidate predicted values, based on a histogram counting most frequently chosen ones among the obtained candidate predicted values in a predesignated time window.

The selecting the one among the obtained candidate predicted values may include selecting, for the obtained attribute, one among the obtained candidate predicted values, using the rate-distortion optimization and based on the obtained order of the obtained candidate predicted values.

Although FIG. 6 shows example blocks of the method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7:
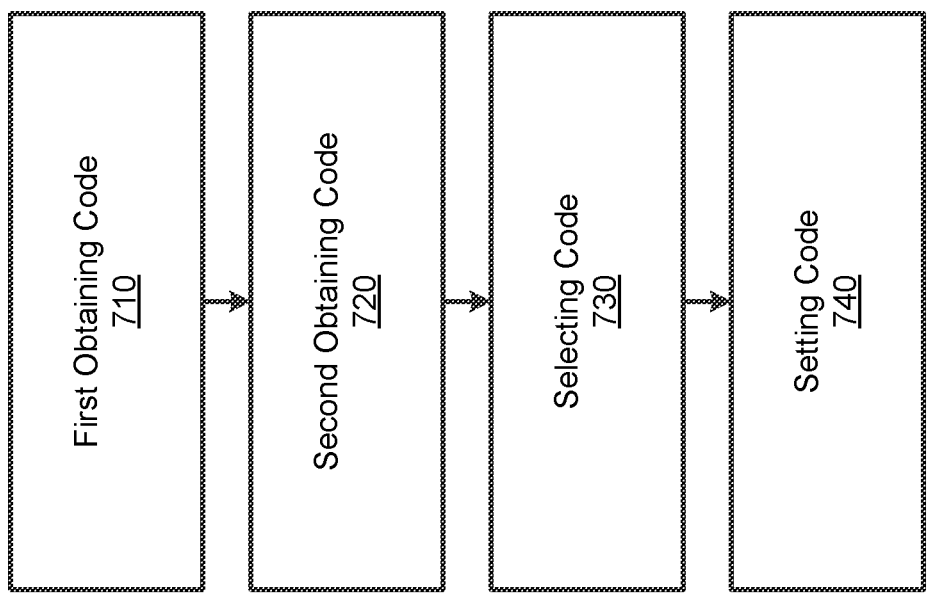
FIG. 7 is a block diagram of an apparatus for adaptive point cloud attribute coding, according to embodiments.
Figure 7:

FIG. 7 is a block diagram of an apparatus 700 for adaptive point cloud attribute coding, according to embodiments.

Referring to FIG. 7, the apparatus 700 includes first obtaining code 710, the second obtaining code 720, selecting code 730 and setting code 740.

The first obtaining code 710 is configured to cause at least one processor to obtain an attribute of a current point included in point cloud data.

The second obtaining code 720 is configured to cause the at least one processor to obtain candidate predicted values of the obtained attribute, the candidate predicted values including any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points.

The selecting code 730 is configured to cause the at least one processor to select, for the obtained attribute, one among the obtained candidate predicted values, using rate-distortion optimization.

The setting code 740 is configured to cause the at least one processor to set, for a decoder, a flag indicating whether the obtained candidate predicted values includes the weighted average value.

The apparatus 700 may further include transmitting code configured to cause the at least one processor to transmit, to the decoder, the flag per sequence or per frame.

The apparatus may further include identifying code configured to cause the at least one processor to identify whether a number of uses of the weighted average value is below a predetermined threshold. The setting code may be further configured to cause the at least one processor to, based on the number of uses of the weighted average value being identified to be below the predetermined threshold, remove the weighted average value from the obtained candidate predicted values and set the flag to indicate that the obtained candidate predicted values do not include the weighted average value.

The identifying code may be further configured to cause the at least one processor to, based on a histogram counting most frequently chosen ones among the obtained candidate predicted values in a predesignated time window.

The apparatus may further include third obtaining code configured to cause the at least one processor to obtain an order of the obtained candidate predicted values, based on a number of uses of each of the obtained candidate predicted values.

The identifying code may be further configured to cause the at least one processor to identify the number of uses of each of the obtained candidate predicted values, based on a histogram counting most frequently chosen ones among the obtained candidate predicted values in a predesignated time window.

The selecting code may be further configured to cause the at least one processor to select, for the obtained attribute, one among the obtained candidate predicted values, using the rate-distortion optimization and based on the obtained order of the obtained candidate predicted values.

Figure 8:
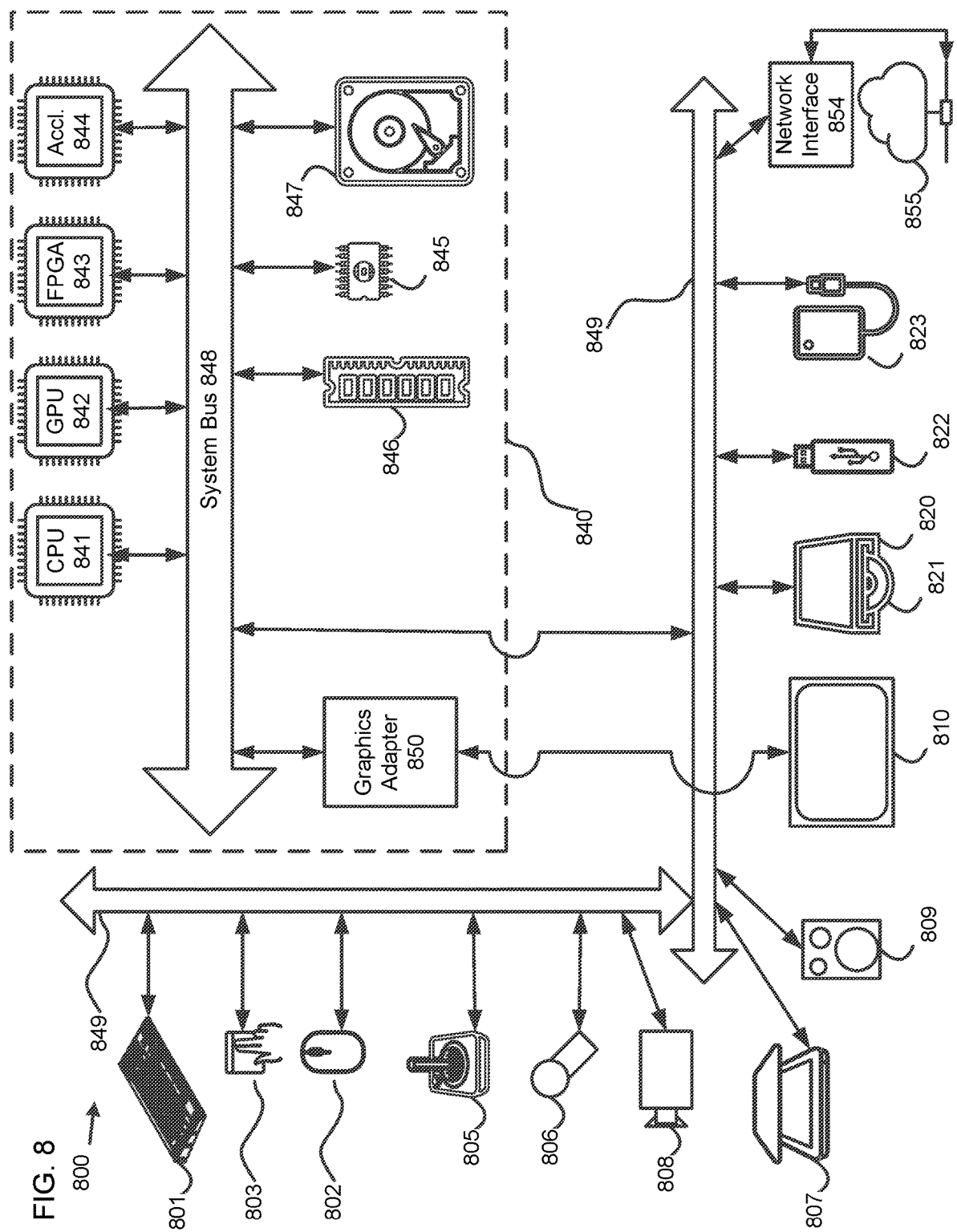
FIG. 8 is a diagram of a computer system suitable for implementing embodiments.

FIG. 8 is a diagram of a computer system 800 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for the computer system 800 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 800.

The computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 801, a mouse 802, a trackpad 803, a touchscreen 810, a joystick 805, a microphone 806, a scanner 807, and a camera 808.

The computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 810 or the joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touchscreen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 850 generates and outputs images to the touchscreen 810.

The computer system 800 can also include human accessible storage devices and their associated media such as optical media including a CD/DVD ROM/RW drive 820 with CD/DVD or the like media 821, a thumb drive 822, a removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 800 can also include interface(s) to one or more communication networks 855. The communication networks 855 can for example be wireless, wireline, optical. The networks 855 can further be local, wide-area, metropolitan, vehicular and industrial, real-time, delay-tolerant, and so on. Examples of the networks 855 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. The networks 855 commonly require external network interface adapters that attached to certain general purpose data ports or peripheral buses 849 (such as, for example universal serial bus (USB) ports of the computer system 800; others are commonly integrated into the core of the computer system 800 by attachment to a system bus as described below, for example, a network interface 854 including an Ethernet interface into a PC computer system and/or a cellular network interface into a smartphone computer system. Using any of these networks 855, the computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 855 and network interfaces 854 as described above.

Aforementioned human interface devices, human-accessible storage devices, and network interfaces 854 can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with read-only memory (ROM) 845, random-access memory (RAM) 846, internal mass storage 847 such as internal non-user accessible hard drives, solid-state drives (SSDs), and the like, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through the peripheral buses 849. Architectures for a peripheral bus include peripheral component interconnect (PCI), USB, and the like.

The CPUs 841, GPUs 842, FPGAs 843, and hardware accelerators 844 can execute certain instructions that, in combination, can make up the aforementioned computer code. That computer code can be stored in the ROM 845 or RAM 846. Transitional data can also be stored in the RAM 846, whereas permanent data can be stored for example, in the internal mass storage 847. Fast storage and retrieve to any of the memory devices can be enabled through the use of cache memory, that can be closely associated with the CPU 841, GPU 842, internal mass storage 847, ROM 845, RAM 846, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 800 having architecture, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as the core-internal mass storage 847 or ROM 845. The software implementing various embodiments can be stored in such devices and executed by the core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in the RAM 846 and modifying such data structures according to the processes defined by the software. In addition or as an alternative, the computer system can provide functionality as a result of logic hardwired or otherwise embodied in a circuit (for example: the hardware accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of adaptive point cloud attribute coding, the method being performed by at least one processor, and the method comprising:
    obtaining an attribute of a current point included in point cloud data;
    obtaining candidate predicted values of the obtained attribute, the candidate predicted values comprising any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points;
    selecting, for the obtained attribute, one among the obtained candidate predicted values, using rate-distortion optimization; and
    setting, for a decoder, a flag indicating whether the obtained candidate predicted values comprises the weighted average value.

2. The method of claim 1, further comprising transmitting, to the decoder, the flag per sequence or per frame.

3. The method of claim 1, further comprising identifying whether a number of uses of the weighted average value is below a predetermined threshold,
    wherein the setting the flag comprises, based on the number of uses of the weighted average value being identified to be below the predetermined threshold, removing the weighted average value from the obtained candidate predicted values and setting the flag to indicate that the obtained candidate predicted values do not comprise the weighted average value.

4. The method of claim 3, further comprising identifying the number of uses of the weighted average value, based on a histogram counting most frequently chosen ones among the obtained candidate predicted values in a predesignated time window.

5. The method of claim 1, further comprising obtaining an order of the obtained candidate predicted values, based on a number of uses of each of the obtained candidate predicted values.

6. The method of claim 5, further comprising identifying the number of uses of each of the obtained candidate predicted values, based on a histogram counting most frequently chosen ones among the obtained candidate predicted values in a predesignated time window.

7. The method of claim 5, wherein the selecting the one among the obtained candidate predicted values comprises selecting, for the obtained attribute, one among the obtained candidate predicted values, using the rate-distortion optimization and based on the obtained order of the obtained candidate predicted values.

8. An apparatus for adaptive point cloud attribute coding, the apparatus comprising:
- at least one memory configured to store computer program code; and
- at least one processor configured to access the at least one memory and operate according to the computer program code, the computer program code comprising:
  - first obtaining code configured to cause the at least one processor to obtain an attribute of a current point included in point cloud data;
  - second obtaining code configured to cause the at least one processor to obtain candidate predicted values of the obtained attribute, the candidate predicted values comprising any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points;
  - selecting code configured to cause the at least one processor to select, for the obtained attribute, one among the obtained candidate predicted values, using rate-distortion optimization; and
  - setting code configured to cause the at least one processor to set, for a decoder, a flag indicating whether the obtained candidate predicted values comprises the weighted average value.

9. The apparatus of claim 8, further comprising transmitting code configured to cause the at least one processor to transmit, to the decoder, the flag per sequence or per frame.

10. The apparatus of claim 8, further comprising identifying code configured to cause the at least one processor to identify whether a number of uses of the weighted average value is below a predetermined threshold,
- wherein the setting code is further configured to cause the at least one processor to, based on the number of uses of the weighted average value being identified to be below the predetermined threshold, remove the weighted average value from the obtained candidate predicted values and set the flag to indicate that the obtained candidate predicted values do not comprise the weighted average value.

11. The apparatus of claim 10, wherein the identifying code is further configured to cause the at least one processor to, based on a histogram counting most frequently chosen ones among the obtained candidate predicted values in a predesignated time window.

12. The apparatus of claim 8, further comprising third obtaining code configured to cause the at least one processor to obtain an order of the obtained candidate predicted values, based on a number of uses of each of the obtained candidate predicted values.

13. The apparatus of claim 12, further comprising identifying code configured to cause the at least one processor to identify the number of uses of each of the obtained candidate predicted values, based on a histogram counting most frequently chosen ones among the obtained candidate predicted values in a predesignated time window.

14. The apparatus of claim 12, wherein the selecting code is further configured to cause the at least one processor to select, for the obtained attribute, one among the obtained candidate predicted values, using the rate-distortion optimization and based on the obtained order of the obtained candidate predicted values.

15. A non-transitory computer-readable storage medium storing instructions that cause at least one processor to:
- obtain an attribute of a current point included in point cloud data;
- obtain candidate predicted values of the obtained attribute, the candidate predicted values comprising any one or any combination of a weighted average value of a plurality of distances from the current point respectively to other points included in the point cloud data, a first predicted value of a first distance from the current point to a first nearest point among the other points and a second predicted value of a second distance from the current point to a second nearest point after the first nearest point among the other points;
- select, for the obtained attribute, one among the obtained candidate predicted values, using rate-distortion optimization; and
- set, for a decoder, a flag indicating whether the obtained candidate predicted values comprises the weighted average value.

16. The non-transitory computer-readable storage medium of claim 15, wherein the instructions further cause the at least one processor to transmit, to the decoder, the flag per sequence or per frame.

17. The non-transitory computer-readable storage medium of claim 15, wherein the instructions further cause the at least one processor to:
- identify whether a number of uses of the weighted average value is below a predetermined threshold; and
- based on the number of uses of the weighted average value being identified to be below the predetermined threshold, remove the weighted average value from the obtained candidate predicted values and set the flag to indicate that the obtained candidate predicted values do not comprise the weighted average value.

18. The non-transitory computer-readable storage medium of claim 17, wherein the instructions further cause the at least one processor to identify the number of uses of the weighted average value, based on a histogram counting most frequently chosen ones among the obtained candidate predicted values in a predesignated time window.

19. The non-transitory computer-readable storage medium of claim 15, wherein the instructions further cause the at least one processor to obtain an order of the obtained candidate predicted values, based on a number of uses of each of the obtained candidate predicted values.

20. The non-transitory computer-readable storage medium of claim 19, wherein the instructions further cause the at least one processor to identify the number of uses of each of the obtained candidate predicted values, based on a histogram counting most frequently chosen ones among the obtained candidate predicted values in a predesignated time window.

\* \* \* \* \*